Figure 1:
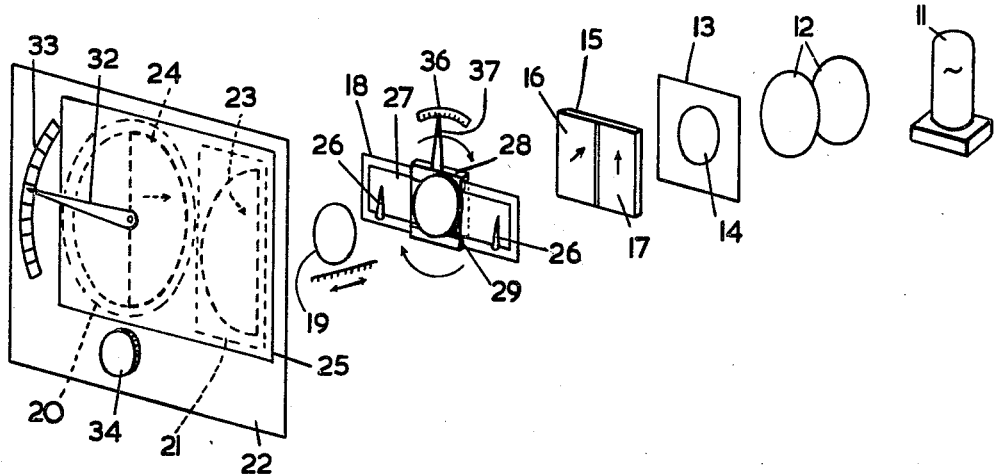

Feb. 2, 1960   H. H. ALLEN   2,923,198
METHOD AND APPARATUS FOR EXAMINING SHEET MATERIALS
Filed July 18, 1956

United States Patent Office 2,923,198
Patented Feb. 2, 1960

2,923,198

METHOD AND APPARATUS FOR EXAMINING SHEET MATERIALS

Henry Hans Allen, London, England, assignor to British Celanese Limited, a corporation of Great Britain Application July 18, 1956, Serial No. 598,709

Claims priority, application Great Britain July 29, 1955

2 Claims. (Cl. 88—14)

This invention relates to the examination of transparent or translucent sheet materials having a base of cellulose acetate or other high polymer, and provides a new method and apparatus for such examination.

An important property of many sheet materials having a basis of high polymers is the degree of anisotropy. This structural property of the material has an important effect on certain secondary physical properties of the material, notably its tenacity, extension, and shrinkage under the action of swelling agents. In addition a measurement of the degree of anisotropy provides an indication of quality which is useful in the manufacture of the material. It is therefore desirable to have a simple means of estimating the degree of anisotropy (and in particular comparing that degree in two samples of the same material) that is rapid and does not involve damaging the material. The present invention provides such a method for transparent materials in which the thickness and degree of anisotropy are small, together with apparatus for carrying out the method. The method and apparatus of the invention also enable changes in the degree of anisotropy between successive samples of sheet made by the same process to be detected even when the sheets are thick and the degree of anisotropy is large. The means provided by the invention for detecting changes in degree of anisotropy between successive samples resulting from a process which aims at avoiding any such change is of particular importance.

The method of the invention is an optical one. According to this method, two beams of light, preferably monochromatic light, of equal intensity and plane-polarised, the first (the test-beam) in a plane at 45° to the optical axis of the specimen, the second (the control-beam) in a plane at 45° to the plane of polarisation of the first, are passed side-by-side through the specimen, which is held in a plane normal to the incident beams, and the emergent beams are then passed through polarising analysers, and are projected on to a screen in a plane parallel to that of the specimen to form side-by-side regions of illumination. The optic axis of the analyser for the test-beam is at 45° to that of the specimen. Preferably (and this arrangement is to be assumed except where otherwise stated) the optic axis of the test-beam analyser is at right-angles to that of the corresponding polariser. The optical axis of the analyser for the control beam is rotated about the axis of that beam and is adjusted to a position such that the two regions of illumination are of the same intensity and the angle between the optic axis of the analyser for the control-beam and that of the polariser for that beam when the regions of illumination are of equal intensity is then determined, preferably by measuring the angle through which the control-beam analyser must be rotated from the position in which the images match to the position in which there is maximum extinction with no specimen present, i.e. the position in which control-beam polariser and analyser are crossed. The angle so measured is the complement of the specified angle. The angle so measured (i.e. the complement of the angle between the optic axes of the control-beam polariser and analyser that gives matching regions of illumination), provided that the thickness and degree of anisotropy of the sheet material tested are not so great as to produce a phase-difference between the ordinary and extraordinary transmitted rays (expressed as an angle) of as much as $\pi$ radians, is a function both of the thickness of the material and of its degree of anisotropy and a rough indication of the relative degree of anisotropy of two samples of a material of the same thickness can be obtained by comparing the specified angle in respect of each of them. A more accurate indication is given by the square of the sine of this angle, i.e. the square of the cosine of the angle between the optic axes of control-beam polarizer and analyser. I have found that this function shows a high positive correlation with various physical properties of the sheet material tested (provided that the degree of anisotropy and thickness are not too great) and with various processing conditions in the production of such material by hot extrusion. Thus, for example, when the ratio of longitudinal tenacity to transverse tenacity was plotted against this function for fifty samples of hot-extruded plasticised cellulose acetate 1-mil films, the points obtained were scattered about a straight line sloping upwards away from the y-axis. When the samples were separated into three classes according to their transverse tenacity the three individual graphs were each similar to the first but with less scatter. When for each group longitudinal and transverse tenacities were plotted against the specified function the longitudinal tenacities were found to be roughly proportional to that function but the transverse tenacities substantially independent of it. As to processing variables there was found to be good positive correlation between the said function and the screw speed during extrusion and between that function and the die temperature, and substantially no correlation between that function and the drawdown between the die and the casting roll, all other variables (including of course, thickness) being kept constant in each case.

In carrying out the invention the two polarised beams may be obtained by passing a single beam from a suitable light source through two polarisers side-by-side, the optic axis of one being at 45° to that of the other. These polarisers may be sheets of plastic material containing crystals so oriented that in a beam incident normally on the sheet double refraction occurs, the ordinary ray is suppressed and the extraordinary ray is polarised in the plane of the optic axis of the sheet. Sheet material of this kind is sold under the registered trademark "Polaroid." The analysers are preferably of the same material as the polarisers and of the same thickness, the optical axis of one analyser being perpendicular to that of the corresponding polariser and the optical axis of the other analyser being rotatable relative to the corresponding polariser.

The screen on to which the two regions of illumination are projected is preferably a back-projection screen lying immediately beyond the analysers. A convenient arrangement is to mount the analysers behind side-by-side window spaces in an opaque panel normal to the direction of the beams and to provide across the front of the window spaces a sheet of suitably translucent material, e.g. paper or ground glass. In the preferred arrangement, means for rotating the specimen are provided and the test-beam polariser and the corresponding analyser are permanently fixed with their optic axes perpendicular to each other, the other polariser is permanently fixed with its optic axis at 45° to the first mentioned polariser, and the corresponding analyser is rotatable behind its window, a scale being provided for reading the angles through which the optic axis of this polariser is rotated (or preferably for reading the square of the sine of the angle of rotation from the crossed position). Then by rotation of the specimen until maximum extinction of the control beam region of illumination is obtained with the control beam polariser and analyser crossed, it can be brought so that its optic axis is at 90° to the control beam polariser and 0° to the control beam analyser or vice versa, and is in consequence at 45° to both the test-beam analyser and the corresponding polariser.

The angle between the optic axes of the analyser and polariser of the control-beam that gives a control-beam region of illumination of the same intensity as the test-beam region of illumination could be determined directly by measuring the angle through which the control-beam analyser must be rotated to give matching regions of illumination, from a position in which the optic axes of control beam analyser and polariser are parallel, the said position being obtained by rotating the control-beam analyser before inserting the specimen until the region of illumination of the control-beam is of maximum intensity. Starting from this position, rotation of the control-beam analyser gradually darkens the control-beam region of illumination until it matches the test-beam image. This is not however the preferred method since there is a greater likelihood of error in deciding the point at which a bright region of illumination reaches its maximum intensity than in deciding where a region of illumination of low intensity reaches its minimum intensty. Thus greater accuracy can be obtained in determining the position in which control analyser and polariser are crossed than in determining that in which their optic axes are parallel. Hence it is preferred to measure the angle through which the control analyser must be turned from the position in which it is crossed with the polariser, to give matching of the regions of illumination. This method has the further advantage that the angle measured is itself a rough measure of the degree of anisotropy in the specimen although a better measure is the square of the sine of the angle.

For focussing the two beams on their respective screens (the webs across the front of the two windows) a simple lens system between the specimen and the analysers may be employed.

The light source may be a sodium lamp or other lamp giving substantially mono-chromatic visible light. A suitable beam may be obtained from such a source by interposing between the lamp and the polarisers (or between any necessary light filter in front of the lamp, and the polarisers) a double condenser and a stop having an aperture of appropriate size.

Thus, apparatus according to the invention comprises: a pair of polarisers of transparent polarising sheet material mounted side-by-side with the optic axis of the first at 45° to that of the second, means for projecting a beam of light on to said polarisers normally thereto and with its axis passing through the junction between them, and, at successive further positions along the axis of said beam, a lens, a pair of analysers of transparent polarising material mounted side-by-side one in front of each polariser and a screen in front of the analysers, all normal to the axis of the beam, the first analyser having its optic axis at right angles to that of the first polariser, the second analyser being rotatable about an axis normal to its surface the arrangement being such that a part of the sheet to be tested can be caused to occupy a position between the polarisers and the lens, normal to said axis, and with its optic axis at 45° to that of the first polariser and that the lens projects two side-by-side regions of illumination on to the screen, one being formed by light that has passed through the first polariser, the sheet under test, and the first analyser and the other by light that has passed through the other polariser, the sheet under test and the other analyser, and means for determining the angle between the optic axes of the two analysers.

Figure 2:
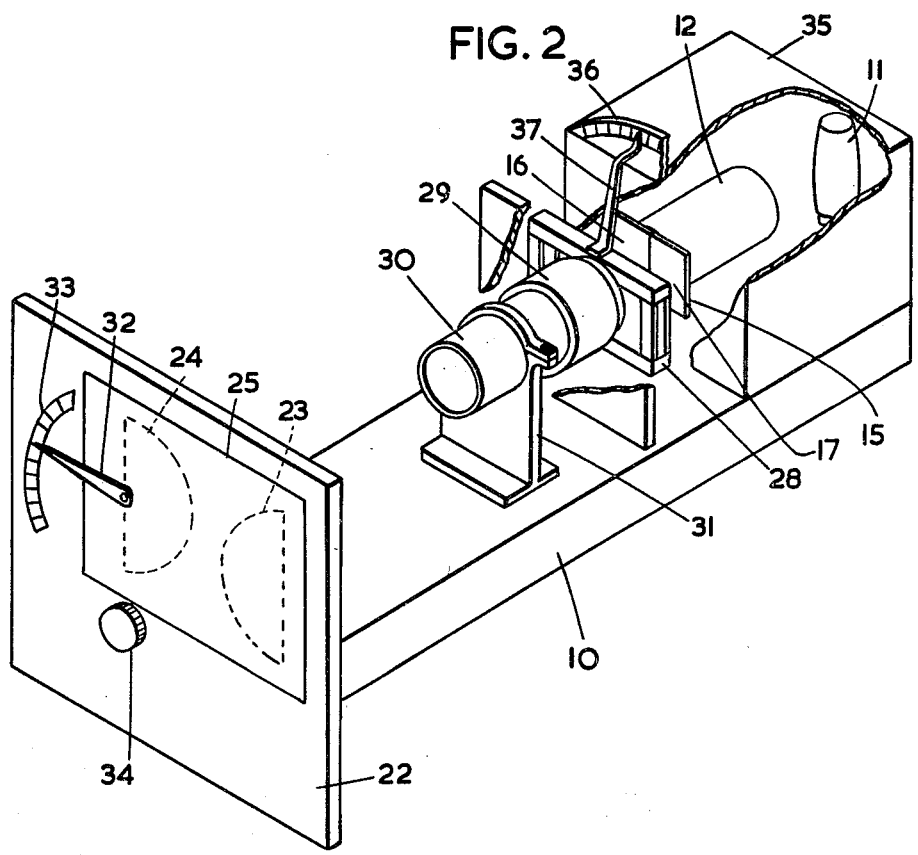

One specific form of instrument according to the invention will now be described by way of example with reference to the accompanying perspective drawings wherein Figure 1 shows diagrammatically the lay-out of the apparatus and Figure 2 shows the apparatus as it appears when assembled.

On a base 10 there are mounted one in front of the other the following components: a sodium lamp 11, a double condenser 12, a stop 13 having a circular aperture 14, a frame 15 carrying two rectangular sheets 16, 17 of polarising material (the polarisers) side-by-side, a specimen-holding frame 18 (slidably and rotatably mounted as described below) a projection lens 19, two analysers 20, 21 of polarising sheet material the first being rotatable and the second fixed, an opaque screen 22 having two D-shaped windows 23, 24 with their curved sides adjacent, each window being covered behind by one of said analysers and in front by a sheet 25 of translucent paper stuck to the front surface of the opaque screen. The arrangement is such that a straight line from the lamp through the centre of the condenser passes in turn through the centre of the aperture, bisects the vertical line of junction between the polarisers and then passes through any specimen held in the specimen-holder, through the centre of the lens, and passes midway between the two windows cutting their axes of symmetry. The planes of the aperture, polarisers, specimen (when in position in the holder) and analysers are all perpendicular to this line.

The two polarisers are fixed with the optic axis of one (17) vertical and the other (16) at 45°.

The specimen-holding frame 18 has clips 26 to hold a specimen 27 of the sheet material to be tested, under slight tension if necessary, perpendicular to the said line. The frame is slidably mounted in a frame holder 28 which is supported by a tube 29 co-axial with the optic axis of the system. This tube is supported by the lens-tube 30 over which it fits in such a way as to be rotatable but to be held by friction in any position to which it has been rotated and to be incapable of axial movement. The lens-tube 30 is supported by a standard 31 fixed to the base.

The lens 19 is mounted in the lens-tube 30 in such a position as to illuminate the D-shaped window 23 in the screen 22 with light that has passed through the polariser 16 (and then through the specimen), and the other window, 24, with light that has passed through the other polariser, 17 (and then through the specimen). Thus, the lens focusses the beam that has passed through the polariser on the lefthand side of the optic axis of the system on the analyser on the righthand side of said axis and vice versa.

The analyser 21 that receives light that has passed through the 45° polariser 16 is conveniently of rectangular shape and is fixed to the back of the screen 22 with its optic axis at 90° to that of the said polariser. The other analyser, 20, is a disc rotatably mounted on the back of said screen. It is provided with a pointer 32 which turns with it, moving over an arcuate scale 33, graduated in degrees, as the disc rotates. The pointer at the zero of the scale when the optic axis of the disc is at right-angles to that of the polariser 15. (Means may be provided for rotating the pointer relative to the disc and clamping it in a particular position relative thereto so as to be able to allow for any slight error in mounting the polariser 17.) A knob 34 is provided for rotating the disc through a reduction gear. The scale may, alternatively be graduated in terms of the square of the sines of the angles between 0 and 90°. Preferably two scales are provided one outside the other so making it possible to read off at will either the angle through which the disc has been turned from the position giving extinction of the control-beam (0°) or the square of sine of that angle.

A light-tight cover 35, properly ventilated, encloses the lamp 11 and condenser 12 the latter being carried by a support (not visible) attached to the base 10. At the forward end of the top of the cover 35 is mounted an arcuate scale 36 graduated in degrees. A pointer 37 fixed to the top of the frame-carrier 28 moves over the scale and serves to indicate any angle through which the specimen has been rotated about the axis of the beam to bring its optic axis to a position at right-angles to that of the polariser 17.

In operation the instrument is first set to zero by rotating the analyser 20 for the control-beam until it is "crossed" with the corresponding polariser 17, i.e. until the brightness of the region of illumination in front of the window 24 is at a minimum. The pointer should then register 0°. If owing to some maladjustment of the polariser 17 the pointer at minimum brightness of the region of illumination is not at zero, the positive or negative angular displacement from zero must be subtracted (algebraically) from the reading of the pointer ultimately obtained. Or if the pointer be rotatable relative to the disc it points to it is moved to zero on the scale and clamped to the disc in that position. Once this has been done this analyser will always be in the crossed position when the pointer is at the zero mark and when it is in this position both halves of the optical field will pass through crossed polarising elements and will therefore appear dark or almost dark when the lamp is switched on.

The specimen 27 is then clamped in the frame 27 and then is slid into such a position in the holder 28 that the part of the specimen to be examined is concentric with the tube 29. The holder 28 is then turned until maximum extinction of the control-beam is obtained (as determined by observing the region of illumination of that beam in front of the window). This means that the optic axis of the specimen is parallel to the control-beam polariser and at right-angles to the control beam analyser or vice versa and is at 45° to the test-beam polariser and analyser. With the specimen in this position (unless it be isotropic) it will be observed that the test-beam forms a region of illumination on the screen, which is brighter than that formed by the control beam. The rotatable analyser is then turned (so increasing the brightness of the control-beam region of illumination) until the two images match. The angle registered by the pointer of the control beam analyser on the scale, or preferably the sine squared of that angle is then read off and gives a measure of the degree of anisotropy of the specimen. Preferably a series of readings are taken, in half of which the matching position is reached by a clockwise movement of the rotatable analyser, and in the other half by an anti-clockwise movement and the mean of the series of readings is taken.

The method can be explained as follows:

The test-beam on entering the specimen may be regarded as split into two beams, one polarised parallel to the optic axis thereof and the other perpendicular thereto. These beams travel through the specimen at different speeds. Both travel through the test beam analyser where each is resolved into two beams, one polarised perpendicular to the optic axis of the analyser (which is suppressed) and one parallel thereto (which emerges). The two beams so emerging from the test beam analyser differ in phase, and this phase difference results in the region of illumination formed on the test beam screen by combining these two beams, being brighter to an extent depending on the phase difference than it would otherwise be. The phase difference is a function of the thickness of the specimen and of the double refraction of the specimen, which latter function as a measure of the degree of anisotropy. Thus, the brightness of the test beam region of illumination is a function of the degree of anisotropy of the specimen. A measure of this brightness is obtained by measuring the angle through which the rotatable analyser has to be turned to increase the brightness of the control beam region of illumination to match that of the test beam region of illumination and taking the square of the sine of this angle. The use of the control beam in this way, serves not only to provide a means of measuring the brightness of the test beam region of illumination but also compensates for the decrease in brightness of the test beam region of illumination due to dissipation of the energy of the light in passing through the material. This dissipation may be substantial when the material treated is highly stretched. It will be observed that in the method of the invention, the control beam passes in turn through a polariser, the specimen and an analyser in just the same way as does the test beam, and the decrease in brightness in the test beam region of illumination due to the dissipation of the light energy, is paralleled by similar decrease of brightness in the control beam region of illumination.

As indicated above, provided that the thickness and degree of anisotropy of the sheet material tested are not such as to produce a phase difference of as much as $\pi$ radians between the two beams forming the test region of illumination, the method of the invention gives a measure of the degree of anisotropy in the samples examined. But, whether or not this condition is satisfied, any change in the angle necessary to match the two regions of illumination that occurs between successive samples is an indication that a change in the degree of anisotropy has occurred, though the sine squared of the angle through which the control-beam analyser has to be turned to give matching of the regions of illumination may no longer be a measure of the degree of anisotropy. Such an indication of change is a valuable one in controlling a process intended to produce sheet of constant characteristics.

Actually, many commercial film-forming processes are such that the condition in question is satisfied in all conditions approaching normal running. Thus for instance in casting cellulose acetate foil on a moving band or wheel, anisotropy in the product is to be avoided as far as possible and is never in any circumstances likely to be such as to cause a phase-difference of as much as $\pi$. The method of the invention may be used to scan the film during its manufacture, or to test samples thereof at intervals and is admirably suited to give warning of any defect in the process leading to stretching of the set film, such as an increase in speed along the path of the set film. This of course would cause an increase in the degree of anisotropy which the method would detect. Similarly the method can be applied to the hot-extrusion of such film. Here some degree of anisotropy may be inevitable owing to the shearing action of the extruded film but, as in making cast films, the degree should not vary in the course of the process. A variation detected by the method of the invention points to a change having occurred in one or other of the process variables, e.g. temperature, screw speed, draw-off speed or the quality of the material.

I have found that the condition as to phase difference referred to is satisfied not only in film of plasticised cellulose acetate of thickness up to 10 mils when made by normal casting and hot-extrusion methods, but also in film of other thermoplastic cellulose derivatives, e.g. cellulose propionate, made by these methods, of hot-extruded polystyrene and of blown and hot-extruded polythene, provided that the film be within the thickness specified and has not been stretched while no longer soft.

Whether the phase-difference condition referred to is fulfilled by a particular sample of material resulting from a film-forming process can readily be determined by measuring, e.g. by means of the Babinet comparator, the phase difference between the light of the two beams which are combined to form the test region of illumination when the sample is examined in the apparatus of the invention. If, in a representative selection of such samples of the process, the phase difference is always substantially below $\pi$ radians, it is a reasonable assumption that in all samples obtained in the normal running of the process the condition in question will be satisfied and that the square of the sine of the angle measured in the test for a particular product of the process will be a true measure of the degree of anisotropy of that product.

In the method and apparatus as so far described the matching of the two regions of illumination is done by eye. It will be appreciated however, that photoelectrical means may be provided for determining the point of matching, the rotatable analyser then being turned by hand until a meter actuated by a current controlled by the photoelectric cells indicates that the match point has been reached. The head turning of the rotatable analyser may also be eliminated and the whole measurement may also be rendered automatic by providing servo means to turn this analyser, operated by photoelectrical control means for matching the two regions of illumination.

The invention also contemplates controlling the hot-extrusion and the casting of film by means of an instrument embodying the principles of the invention. In the hot extrusion of a particular cellulose acetate composition through a die of particular dimensions, the variables are: temperature, screw speed, relative rates of casting roll and screw, and relative rates of casting roll and draw-off means. Of these all save the third affect the degree of isotropy of the material and the third affects the thickness. According to the invention the degree of isotropy can be continuously controlled by employing an instrument of the kind referred to to control one of these variables through suitable servo mechanism the others being kept constant.

In the process and apparatus specifically described above, the test beam analyser has been described as fixed with its optic axis perpendicular to that of the test beam polariser, the latter having its optic axis at 45° to that of the specimen. With this arrangement the introduction of the specimen gives a brighter test beam region of illumination than is obtained in the absence of the specimen. According to a modification of the arrangement however, the optic axis of the test beam analyser is fixed parallel to that of the corresponding polariser (both being as before at 45° to that of the specimen). With this arrangement the test beam region of illumination is darker (unless the specimen be isotropic in which case there will be no difference in brightness) when the specimen is in position than in its absence. This region of illumination is matched by rotation of the control beam anlyser, the angle of rotation of that analyser from the position giving maximum brightness being determined. Any change in this angle between successive specimens examined indicates a change in the degree of anisotropy. It will be appreciated therefore that an essential condition of the method and apparatus of the invention is that both test beam polariser and test beam analyser should have their optic axes at 45° to that of the specimen. It is preferred but not essential that the axes of this polariser and analyser should be perpendicular to one another rather than parallel, especially since it is easier to match two regions of illumination of low intensity, than two regions of illumination of high intensity.

The invention has been described with particular reference to the testing of thin films of cellulose acetate. Similarly it can be used upon films of other organic substitution products of cellulose, e.g. cellulose ethers such as ethyl cellulose and benzyl cellulose, and especially cellulose esters of other paraffinic monocarboxylic acids containing 2 to 4 carbon atoms, e.g. cellulose propionate, butyrate, acetate-propionate and acetate-butyrate. The method and apparatus of the invention can also be used with transparent or translucent sheet materials of other polymers, especially linear polymers, including polyvinyl chloride and the copolymers of vinyl chloride with other ethylenic monomers, e.g. vinyl acetate, vinylidene chloride, acrylonitrile and methacrylonitrile, copolymers of vinylidene chloride with acrylonitrile and methacrylonitrile, polystyrene and styrene copolymers polyacrylates polymethacrylates and polychloroacrylates, polythene and copolymers of ethylene, and polymeric derivatives of the cellulose esters and of the vinyl and vinylidene polymers, e.g. regenerated cellulose and polyvinyl alcohol. The method and apparatus may also be used with condensation polymers such as the nylons, polyethylene terephthalate and polyamino triazoles. The best results have been obtained with amorphous materials, where the effect of orientation is not complicated by the effect of crystallinity. Of the polymers referred to above, the cellulose derivatives (with the exception of annealed cellulose triacetate), polyvinyl alcohol, the ethylenic copolymers and the vinyl polymers with the exception of those containing a high proportion of vinylidene chloride, are amorphous.

Having described my invention, what I desire to secure by Letters Patent is:

1. Apparatus for assessing the anisotropy of transparent sheet material having a basis of a high polymer, which comprises: a pair of polarisers of transparent polarising sheet material fixed side-by-side with the optic axis of the first at 45° to that of the second, means for projecting a beam of substantially monochromatic light on to said polarisers normally thereto and with its axis passing through the junction between them, and, at successive further positions along the axis of said beam, a lens, a pair of analysers of transparent polarising material mounted side-by-side one in front of each polariser and a screen in front of the analysers, all normal to the axis of the beam, the first analyser being fixed with its optic axis at right angles to that of the first polariser, the second analyser being rotatable about an axis normal to its surface, a carrier for holding the test sheet between the polarizers and the lens in a plane normal to the beam, said carrier being rotatable in a plane normal to the beam, the arrangement being such that the lens projects two side-by-side regions of illumination on to the screen, one being formed by light that has passed through the first polariser, the sheet under test, and the first analyser and the other by light that has passed through the other polariser, the sheet under test and the other analyser, and means for indicating the angle between the optic axes of the two analysers.

2. An optical method of assessing the anisotropy of transparent sheet material having a basis of high polymer, which comprises passing through the sheet, normally thereto and side-by-side a test-beam and a control-beam, both of monochromatic light of the same wavelength and intensity and both plane-polarised, one in a plane inclined at 45° to that of the other, passing said beams after they emerge from the sheet through polarising analysers and focussing them on a screen parallel to the sheet to form side-by-side images, keeping the optic axis of the analyser for the test-beam inclined at an angle of 90° to the initial plane of polarisation of that beam, setting the analyser for the control-beam with its optical axis at right angles to the initial plane of polarisation of that beam, rotating the sheet in a plane normal to the said beams into a position in which it produces maximum extinction of the control-beam image and keeping it there, rotating the control-beam analyser through such an angle that the images of control-beam and test-beam are of substantially the same intensity and measuring the said angle.

References Cited in the file of this patent

UNITED STATES PATENTS

| | | |
|---|---|---|
| 2,509,068 | McMahon | May 23, 1950 |

FOREIGN PATENTS

| | | |
|---|---|---|
| 715,057 | Great Britain | Sept. 8, 1954 |
| 731,095 | Germany | Feb. 1, 1943 |